(12) United States Patent
Chong et al.

(10) Patent No.: US 8,107,428 B2
(45) Date of Patent: Jan. 31, 2012

(54) METHOD OF RANGING SIGNAL DESIGN AND TRANSMISSION FOR MIMO-OFDMA INITIAL RANGING PROCESS

(75) Inventors: Chia-Chin Chong, Santa Clara, CA (US); Hlaing Minn, Richardson, TX (US); Fujio Watanabe, Union City, CA (US); Hiroshi Inamura, Cupertino, CA (US)

(73) Assignee: NTT DoCoMo, Inc., Tokyo (JP)

( * ) Notice: Subject to any disclaimer, the term of this patent is extended or adjusted under 35 U.S.C. 154(b) by 689 days.

(21) Appl. No.: 12/277,110

(22) Filed: Nov. 24, 2008

(65) Prior Publication Data

US 2009/0147872 A1    Jun. 11, 2009

Related U.S. Application Data

(60) Provisional application No. 60/992,992, filed on Dec. 6, 2007, provisional application No. 60/992,996, filed on Dec. 6, 2007.

(51) Int. Cl.
*H04W 4/00* (2009.01)
*H04J 11/00* (2006.01)
*H04L 27/28* (2006.01)

(52) U.S. Cl. ............... 370/329; 370/203; 375/260

(58) Field of Classification Search .......... None
See application file for complete search history.

(56) References Cited

U.S. PATENT DOCUMENTS

| | | | | |
|---|---|---|---|---|
| 2003/0198179 A1* | 10/2003 | Koo et al. | | 370/208 |
| 2005/0041573 A1* | 2/2005 | Eom et al. | | 370/208 |
| 2005/0058058 A1* | 3/2005 | Cho et al. | | 370/208 |
| 2005/0117539 A1* | 6/2005 | Song et al. | | 370/328 |
| 2005/0135230 A1* | 6/2005 | Yu et al. | | 370/210 |
| 2005/0141474 A1* | 6/2005 | Lee et al. | | 370/343 |
| 2006/0098749 A1* | 5/2006 | Sung et al. | | 375/260 |
| 2007/0058524 A1* | 3/2007 | Modlin et al. | | 370/208 |
| 2007/0202882 A1* | 8/2007 | Ju et al. | | 455/450 |

FOREIGN PATENT DOCUMENTS

WO     2007/100224     9/2007

OTHER PUBLICATIONS

PCT International Search Report for International Application No. PCT/US2008/084711 dated Feb. 4, 2009, 3 pages.

(Continued)

*Primary Examiner* — Clemence Han
(74) *Attorney, Agent, or Firm* — Haynes and Boone, LLP

(57) ABSTRACT

A mobile communication system uses a multiple-input-multiple-output (MIMO) technology with an orthogonal frequency division multiplexing access (OFDMA) scheme. At network entry, an initial ranging method selects from multiple ranging signal designs to accomplish the initial ranging process. Three classes of ranging signal designs may be selected for use in generating ranging codes. The information on the ranging signal design to be used, which is selected by the base station based on the cell size of the communication system (i.e., the radio coverage area of the base station), is broadcast from the BS. The ranging signal designs are directly applicable to single-antenna systems, and they are applied to MIMO systems by using appropriate mapping across transmit antennas based on the adopted MIMO ranging transmission scheme. Optimum eigenmode and suboptimum eigenmode transmission schemes provide the best performance at high computational complexity and high power consumption.

18 Claims, 9 Drawing Sheets

OTHER PUBLICATIONS

PCT Written Opinion of the International Searching Authority for International Application No. PCT/US2008/084711 dated Feb. 4, 2009, 3 pages.

"IEEE Standard for Local and Metropolitan Area Networks Part 16: Air Interface for Fixed Broadband Wireless Access Systems," IEEE Std 802.16-2004, Oct. 1, 2004.

"IEEE Standard for Local and Metropolitan Area Networks Part 16: Air Interface for Fixed and Mobile Broadband Wireless Access Systems," IEEE Std 802.16e-2005, Feb. 28, 2006.

J. Zeng, H. Minn, and C.-C. Chong, "Diversity exploiting MIMO-OFDMA ranging," *IEEE Trans. Wireless Commun.*, under preparation, May 31, 2008.

* cited by examiner

METHOD OF RANGING SIGNAL DESIGN AND TRANSMISSION FOR MIMO-OFDMA INITIAL RANGING PROCESS

CROSS REFERENCE TO RELATED APPLICATIONS

The present invention relates to and claims priority of U.S. provisional patent applications ("Provisional Patent Applications"): (a) Ser. No. 60/992,992, entitled "Method for Ranging Signal Design for a MIMO-OFDMA Initial Ranging Process," filed on Dec. 6, 2007; and (b) Ser. No. 60/992,996, entitled "Method and System of Initial Ranging Transmission for MIMO-OFDMA Systems," filed on Dec. 6, 2007. The Provisional Patent Applications are hereby incorporated by reference in their entireties.

BACKGROUND OF THE INVENTION

1. Field of Invention

The present invention relates to ranging methods in wireless communication. In particular, the present invention relates to ranging methods used in conjunction with uplink (UL) multi-user timing synchronization and power control applications in orthogonal frequency division multiple access (OFDMA) systems.

2. Discussion of the Related Art

In an OFDMA mobile communication system, various ranging methods for UL synchronization or power control between a mobile station (MS)[1] and a base station (BS) have been developed to improve robustness (e.g., prevent the ranging code collision) and reduce network latency (e.g., reduce access delay).

[1] The MS is also referred to as a subscriber station (SS) or a user element (UE).

An initial ranging and periodic ranging method is disclosed in U.S. Patent Application Publication, no. 2007/0058524 ("Modlin"), which is entitled "Orthogonal Frequency Division Multiplexing Access (OFDMA) ranging," naming as inventors C. S. Modlin and T. Muharemovic and which was published on Mar. 15, 2007. In Modlin's method, the received signal consists of OFDMA symbols. Under Modlin, a fast Fourier transform (FFT) is firstly performed on the received signal, from which the ranging codes of the received signal are extracted and compared with a ranging code hypothesis. After the matching ranging codes are identified, a power estimate for each ranging code is compared to a power threshold to confirm correct receipt of the ranging code. Finally, the timing offset and the power of the received signal are reported. Modlin discloses both a ranging code hypothesis and phase drift detections based on the matching extracted ranging codes. The ranging code hypothesis is used to estimate delay and power. Although Modlin's method may be extended to support multiple reception antennas, the complexity of such an implementation is high. Furthermore, the matching process requires long processing time at the BS and thus, increases both the latency and the access delay of the overall network. More importantly, the ranging code detection scheme does not adequately take into consideration channel frequency-selectivity, so that orthogonality among ranging codes is poor, resulting in significant multiuser interferences. Furthermore, the timing offset and power estimation requirements fail to consider other ranging codes, thus causing interferences and may degrade performance significantly.

An apparatus and a method for processing a ranging channel at the BS are disclosed in U.S. Patent Application Publication, no. 2005/0135230 ("Yu"), which is entitled "Apparatus and Method for Processing Ranging Channel in Orthogonal Frequency Division Multiple Access System," naming as inventors C. W. Yu, K. Y. Sohn, Y. O. Park, and S. K. Hwang, and which was published on Jun. 23, 2005. Yu measures the propagation delay and the power of each MS in the UL of an OFDMA system. In particular, Yu discloses a BS's receiver which processes a ranging channel using a ranging channel signal extractor and a ranging channel processor. The ranging channel signal extractor selects the subcarriers allocated to the ranging channel. The ranging channel processor then correlates the subcarriers in time to estimate the propagation delays of the ranging channel and integrates the subcarriers to measure the magnitude or power of the signal of the ranging channel. Yu converts the received ranging complex signals to polar coordinates for delay estimation and converting the polar coordinates back to complex coordinates for magnitude or power estimation in the integrator. Yu's technique reduces receiver complexity; however, its technique is limited to single-antenna systems.

An apparatus and a method at a BS for receiving a ranging signal in an OFDMA communication system are disclosed in U.S. Patent Application Publication, no. 2006/0098749 ("Sung"), which is entitled "Apparatus and Method for Detecting Ranging Signal in an Orthogonal Frequency Division Multiple Access Mobile Communication System," naming as inventors S. H. Sung, I. S. Hwang, S. Y. Yoon, C. R. Chang, and J. H. Cho, and which was published on May 11, 2006. Sung discloses, in an OFDMA mobile communication system, a method of reducing a computation requirement for ranging signal detection and for improving ranging detection performance even at a low carrier-to-interference-plus-noise-ratio (CINR). Sung's technique is limited to single-antenna systems.

An UL timing synchronization method between a SS and a BS in an OFDMA communication system is disclosed in U.S. Pat. No. 7,359,366 ("Lee"), which is entitled "Uplink Ranging System and Method in OFDMA System," naming as inventors Y. H. Lee, J. W. Kim, Y. O. Park, S. K. Hwang, and which was published on Jun. 30, 2005. Lee discloses both a new ranging system and a new ranging method. In particular, Lee discloses ranging in the BS without an additional FFT process and without mitigating restrictions on both the ranging speed and the location of the ranging system. Lee also discloses sequentially executing functions in various blocks of the ranging system. Lee also discloses ranging at a relatively high processing speed without carrying out an FFT to detect a complex exponential component of a timing error.

While the ranging methods of Yu, Sung and Lee reduce implementation complexity at the BS (as compared, for example, to conventional techniques[2]), all of these methods are limited to single-antenna systems and are inapplicable for multiple antennas systems. Hence, for next-generation broadband wireless access systems that deploy multiple-input-multiple-output (MIMO) technology (e.g., those systems under the IEEE 802.16m standard), the methods of Yu, Sung and Lee may become impractical. Yu, Sung and Lee also do not take into account the sensitivity of their ranging signals to other data users and ranging users. Also, these schemes do not consider effect of channel frequency selectivity and do not efficiently exploit various forms of diversity.

[2] See, e.g., "IEEE Standard for Local and Metropolitan Area Networks Part 16: Air Interface for Fixed Broadband Wireless Access Systems," IEEE Std 802.16-2004, 1 Oct. 2004.

Turning to ranging signal designs, a ranging method for minimizing access delay and for preventing ranging code collisions is disclosed in U.S. Patent Application Publication, no. 2005/0058058 ("Cho"), which is entitled "Ranging Method in a Mobile Communication System Using Orthogonal Frequency Division Multiple Access," naming as inventors M. H. Cho, B. G Song, S. H. Sung, and K. S. Eom, and which was published on Mar. 17, 2005. To reduce access delay and to prevent ranging code collisions, Cho discloses performing, according to a state of a SS, an adaptive bandwidth request ranging based on a scheduled access technique or a random access technique. Specifically, Cho's method allows an SS in an active state to preferentially perform a scheduled access-based bandwidth request ranging. Cho's method avoids an access delay caused by a ranging code collision and improves data transmission efficiency. However, Cho's method is applicable only for a bandwidth request ranging that is performed after a successful initial ranging.

A system and method for ranging for a fast handover in an OFDMA communications system are disclosed in U.S. Pat. No. 7,307,973 ("Song"), which is entitled "System and Method for Ranging for a Fast Handover in a Mobile Communication System," naming as inventors B. G. Song, K. S. Eom, M. H. Cho, H. J. Ju, and which was published on Jun. 2, 2005. Song discloses a ranging method that reduces delay time for a SS subject to a handover. Song's method utilizes specific ranging codes and ranging slots in an OFDMA system to perform a handover ranging which avoids ranging code collisions while minimizing access delay time. In particular, Song allocates a handover ranging code and a handover ranging slot for the handover ranging. Under Song's method, when an SS handovers from a serving BS to a target BS, the handover ranging may be performed without an initial ranging. By allocating ranging codes for handover ranging (i.e., "handover ranging codes"), ranging code collisions between handover ranging and non-handover ranging operations are avoided, thereby achieving a fast handover. However, Song's handover ranging scheme is only applicable for an SS that is in the process of a handover. Furthermore, by dedicating some codes to handover ranging, less ranging codes are available for conventional ranging operations (e.g., initial ranging, periodic ranging and bandwidth request ranging). As a result, both the probability of code collision during non-handover ranging operations and the times incurred for retransmissions due to collisions are increased.

A ranging method for an OFDMA communication system that divides the ranging procedure between a transmission side (e.g., BS) and reception sides (e.g., UEs) into three categories is disclosed U.S. Pat. No. 7,310,303 ("Koo"), which is entitled "Ranging Method for Mobile Communication System Based on Orthogonal Frequency Division Multiple Access Scheme," naming as inventors C. H. Koo, D. S. Park, and P. Y. Joo, and which was published on Oct. 23, 2005. Koo discloses a ranging code allocation method and a method for reducing a UE's access delay time, by assigning an independent backoff value to each ranging code. In particular, Koo classifies ranging codes for initial ranging, bandwidth request ranging, and periodic ranging. The BS informs a UE of the range of ranging codes that are currently available for the UE, assigns different ranging codes and their backoff values to the ranging processes according to ranging objectives, and informs a UE of such allocation result. The BS dynamically assigns the number of ranging codes and their backoff values to the ranging processes according to the BS's cell status and a ranging objective. Koo's method results in a minimal UL access delay time and a minimal number of UL access collisions. Koo's method, however, requires new settings in the UL_MAP and the UL Channel Descriptor (UCD) messages which the BS sends to UEs. Consequently, both the complexity of the system and the overall network latency are increased. Furthermore, classifying ranging codes into several categories also reduces the number of ranging codes available for selection, so that the number of UEs that can be supported in each cell is reduced.

SUMMARY

According to one embodiment of the present invention, a mobile communication system uses a MIMO technology with an OFDMA scheme. At network entry, an initial ranging method selects from multiple ranging signal designs to accomplish the initial ranging process. In one embodiment, one of the three classes of ranging signal designs may be selected for use in generating ranging codes. The ranging signal is designed based on the cell size of the communication system (i.e., the radio coverage area of the BS). The ranging signal design to be used is selected based on the cell size information as well.

The ranging signal designs of the present invention have the advantage over the prior art in term of efficiency and low-complexity in the ranging process. In particular, the ranging signal designs of the present invention have better ranging performance, achieve greater energy savings, and are less computationally complex. Furthermore, the present invention provides higher flexibility, scalability and adaptability to changes in system environments (e.g., different cell sizes). Such ranging signal designs can be directly applied to single-antenna systems and MIMO systems. When applied to MIMO systems, the ranging signals are mapped to multiple transmission antennas based on the adopted MIMO ranging transmission scheme mentioned below.

According to one embodiment of the present invention, the ranging SS in a time-division duplex (TDD) OFDMA system exploits the channel knowledge obtained from the DL frame since its first ranging transmission to achieve power control and diversity exploitation. The SS selects a ranging subchannel based on this channel knowledge and the adopted ranging transmission scheme mentioned below.

According to another embodiment, a mobile communication system using MIMO technology with an OFDMA scheme selects from multiple ranging transmission schemes of different levels of computation complexity, power consumption and performance. In one example, optimum eigenmode and suboptimum eigenmode transmission schemes provide the best performance at high computational complexity and high power consumption. A simpler single-antenna selection transmission scheme provides significantly reduced computational complexity and achieves power saving at a marginal degradation in system performance.

One advantage of the ranging signal transmission schemes of the present invention over the prior art is their efficient exploitation of diversities of multiuser wireless channels. Another advantage is their capability to provide flexibility and scalability between performance and computation trade-offs. In particular, the ranging signal transmission schemes of the present invention (e.g., Optimal Eigenmode Transmission Scheme (OETS), Suboptimal Eigenmode Transmission Scheme (SETS) and Single-Antenna Selection Transmission Scheme (SASTS)) achieve significant power saving and reduces computational complexity.

The present invention is better understood upon consideration of the detailed description below, in conjunction with the accompanying drawings.

DETAILED DESCRIPTION OF THE PREFERRED EMBODIMENTS

In an OFDMA communication system using TDD, a ranging process is required to accurately synchronize timing between each SS and the BS, and to adjust the transmit power of each SS in the UL. Such UL timing synchronization and power control operations suppress interferences, avoid near-far problems, and hence maintain reliable multiuser wireless links. Existing OFDMA systems (e.g., systems under the IEEE 802.16a and IEEE 802.16e[3] standards) define a ranging process for UL synchronization and power control. In this detailed description, a "ranging signal" is a signal transmitted by a SS to help the BS acquire UL timing and power information. The "ranging channel", here, refers to the total system resources (i.e., subcarriers and time slots) reserved for the ranging process, and may contain several ranging subchannels (i.e., groups of subcarriers). A "ranging time slot" refers to a predefined number of OFDM symbol intervals for a ranging transmission. The UCD/UL-MAP message contains information of the ranging channel, time slots and subchannels. A "ranging process" may be an initial ranging process, a bandwidth request ranging process, or a periodic ranging process (a.k.a. maintenance ranging process). An initial ranging process involves transmitting ranging signals by ranging SSs to the BS, acquiring at the BS a correct timing offset between the BS and each of the ranging SSs and the corresponding received power level, sending timing and power adjustment information back to the ranging SSs, and making the corresponding adjustments at the ranging SSs, so that the BS and SSs attain time and power synchronizations with respect to each other during initial network entry. A bandwidth request ranging process requests a bandwidth allocation for data communication between a BS and a SS. A periodic ranging process periodically tracks the UL timing offset and received signal strength after initial ranging to allow the SS adjust transmission parameters periodically and to maintain reliable UL communications with the BS.

[3] "IEEE Standard for Local and Metropolitan Area Networks Part 16: Air Interface for Fixed and Mobile Broadband Wireless Access Systems," IEEE Std. 802.16e-2005, 28 Feb. 2006.

Figure 1:
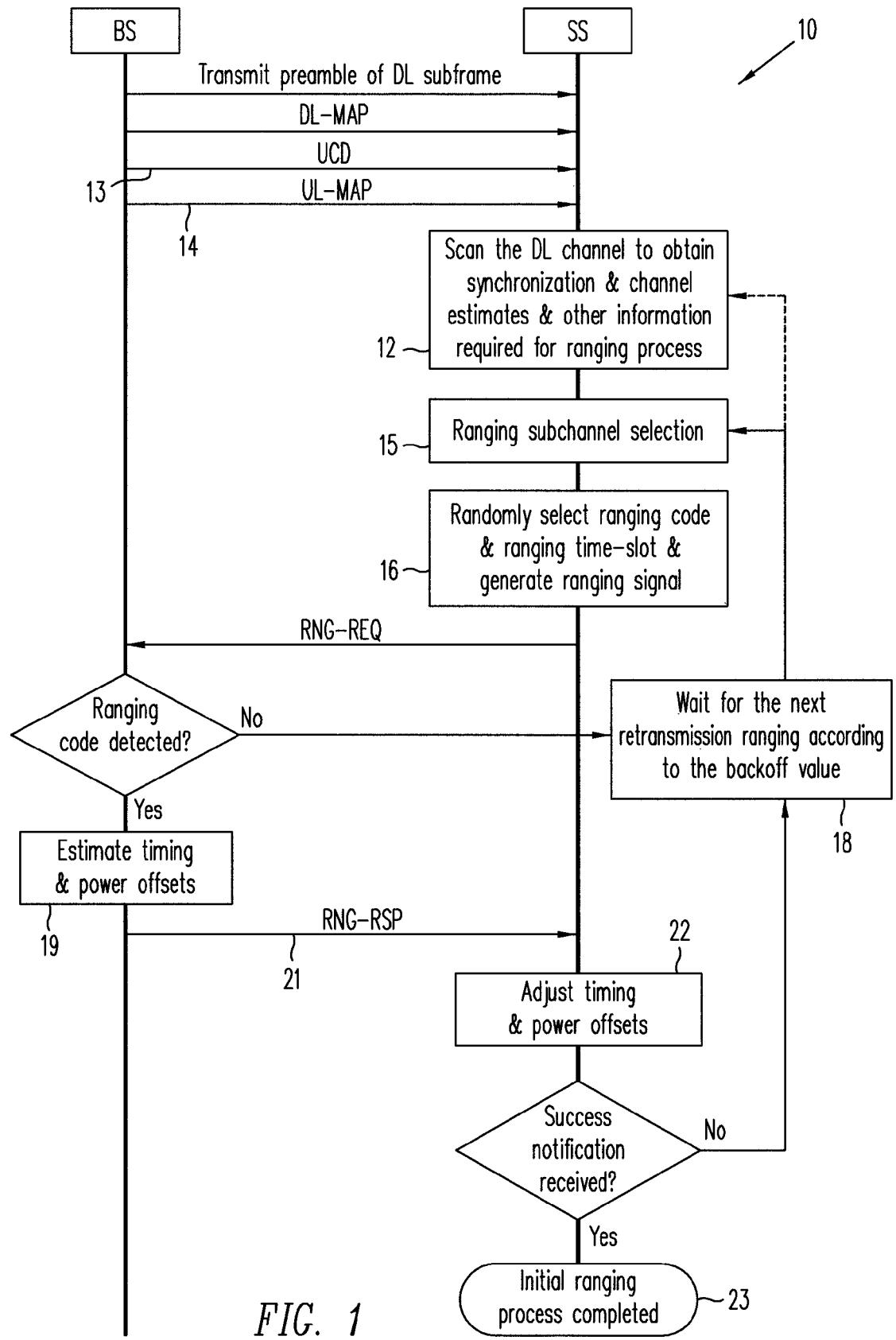
FIG. 1 summarizes initial ranging process 10 for an OFDMA communication system, in accordance with one embodiment of the present invention.

The present invention provides ranging signal designs for initial ranging process. FIG. 1 summarizes initial ranging process 10 for an OFDMA communication system, in accordance with one embodiment of the present invention. During the initial ranging process, each SS scans for a downlink (DL) channel (step 12) to obtain DL synchronization and transmission parameters, which include a UCD message (step 13) that contains information of the ranging process (e.g., ranging channel, ranging slot, ranging codes, etc.), followed by a UL-MAP message (step 14) in one DL frame. After obtaining DL synchronization, channel estimates, and ranging channel information, each SS performs a ranging subchannel selection (step 15) based on the channel knowledge and the adopted ranging transmission scheme. Then each SS randomly selects and transmits an available ranging code on the selected ranging subchannel over several consecutive OFDM symbols (step 16). The BS detects the ranging codes and estimates the timing offsets and powers from the received ranging signals (step 19). Upon successfully receiving a ranging code, the BS sends the sending SS a ranging response (RNG-RSP) message (step 21) that includes information regarding the detected ranging code and the ranging time-slot at which the ranging code is identified. The RNG-RSP message may also contain needed adjustments (e.g., timing and power adjustments) and a status notification (e.g., success or continue). Upon receiving the RNG-RSP message, the SS adjusts the timing and the transmission power (step 22), using the information included in the RNG-RSP message, and repeats ranging transmission until it receives RNG-RSP message with the success notification from the BS (step 23). If the SS does not receive the RNG-RSP message corresponding to its ranging attempt, the SS will re-initiate the initial ranging process in the next UL frame or after a backoff value (step 18).

Figure 2:
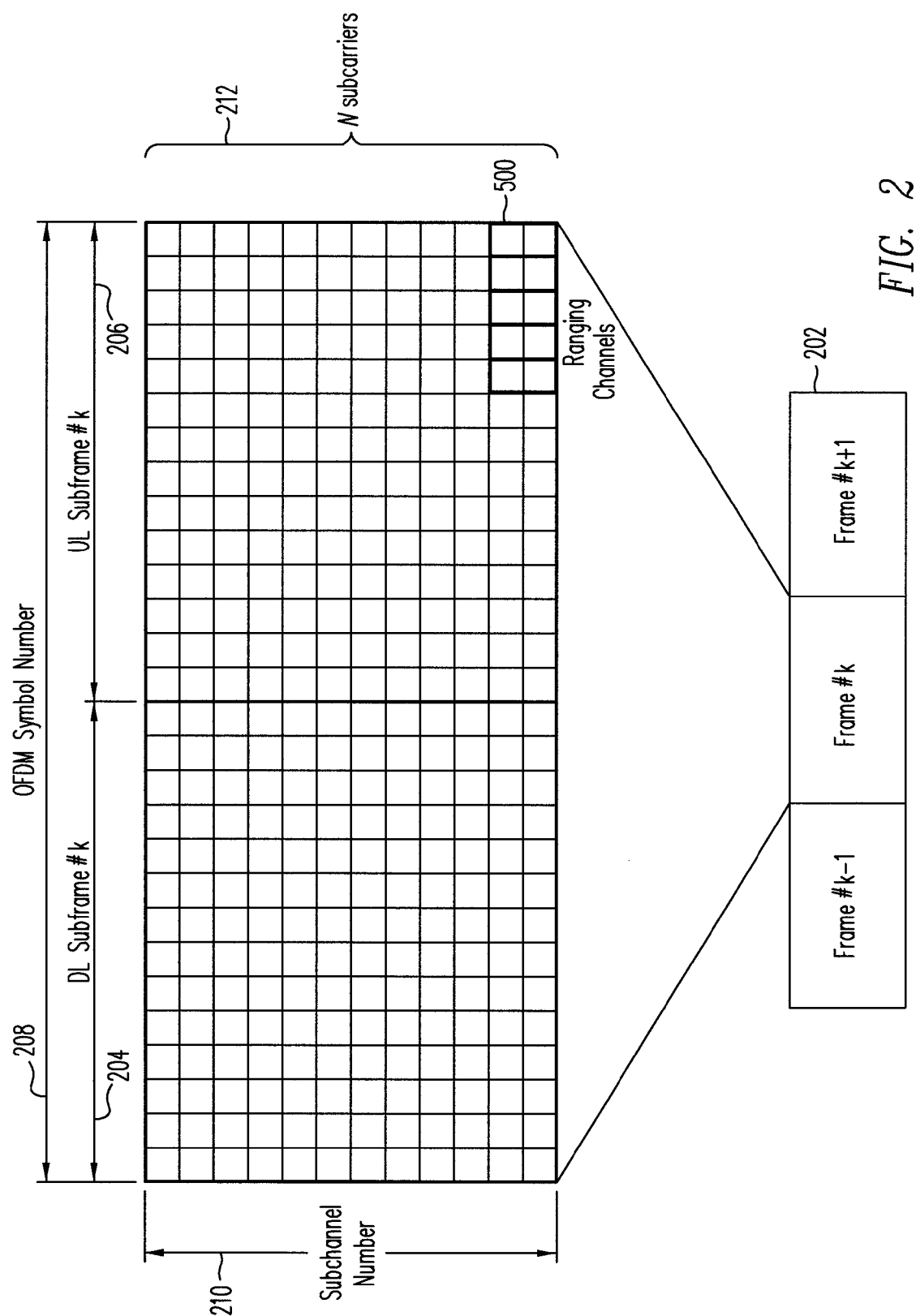
FIG. 2 illustrates a TDD OFDMA frame, in accordance with one embodiment of the present invention.

FIG. 2 illustrates a TDD OFDMA frame, in accordance with one embodiment of the present invention. As shown in FIG. 2, TDD OFDMA frame 202 consists of DL subframe 204 and UL subframe 206. Both DL subframe 204 and UL subframe 206 include a number of OFDM symbol intervals (indicated by reference numeral 208). OFDMA frame utilizes a number of subchannels (indicated by reference numeral 210), consisting of N subcarriers (indicated by reference numeral 212). Furthermore, UL subframe 204 includes a number of subchannels grouped as a ranging channel (indicated by reference numeral 500).

Figure 3:
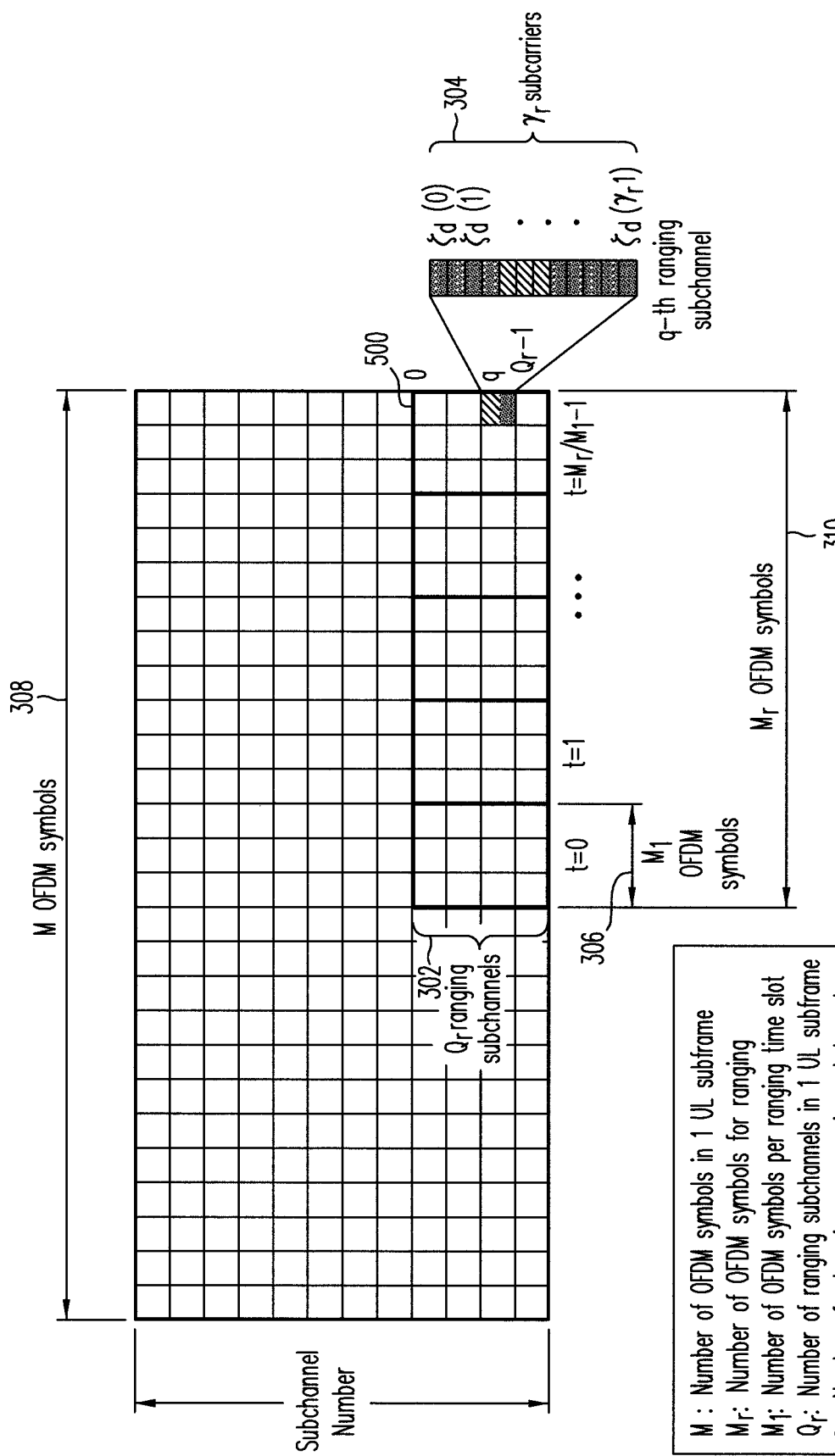
FIG. 3 illustrates ranging channels within an UL subframe, in accordance with one embodiment of the present invention.

FIG. 3 illustrates the ranging channel within an UL subframe, in accordance with one embodiment of the present invention. FIG. 3 shows an OFDMA system in which an UL subframe includes M OFDM symbol intervals (reference numeral 308). The UL subframe contains a number of ranging subchannels (reference numeral 500), over predetermined number $$\frac{M_r}{M_I}$$

of ranging time slots, where $M_r$ and $M_I$ are the numbers of OFDM symbol intervals allocated for the ranging channel (reference numerals 310) and the number of OFDM symbol intervals in each ranging subchannel (reference numerals 306), respectively. The OFDM symbols allocated for ranging are indexed by variable $m_r \in \{0, 1, \ldots, M_r-1\}$. As shown in FIG. 3, the ranging time slots are indexed by variable $$t \in \left\{0, 1, \ldots, \frac{M_r}{M_I} - 1\right\},$$

with each ranging time slot consisting of $Q_r$ subchannels (reference number 302). The ranging subchannels within a ranging channel are indexed by variable $q \in \{0, \ldots, Q_r-1\}$. Each ranging subchannel consists of $\gamma_r$ adjacent subcarriers which are disjoint from those of other ranging subchannels. The subcarrier indexes for the q-th ranging subchannel are given by: $\xi_q \in \{\xi_q(0), \xi_q(1), \ldots, \xi_q(\gamma_r-1)\}$. The ranging subchannels are spread out over the whole frequency band with approximately equal spacing.

Figure 4:
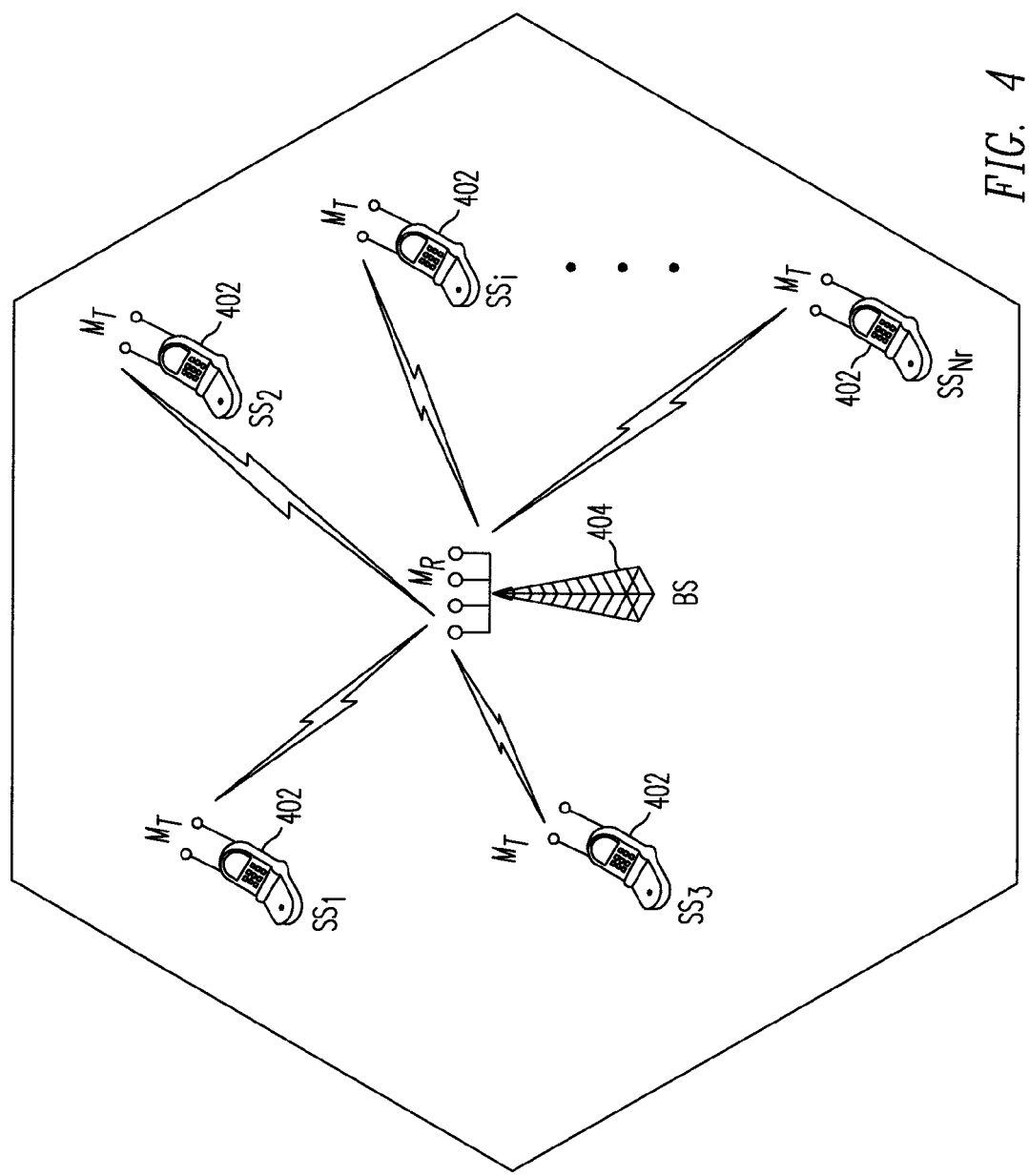
FIG. 4 shows an $M_T \times M_R$ MIMO OFDMA system having $N_r$ SSs, according to one embodiment of the present invention.

FIG. 4 shows an $M_T \times M_R$ MIMO-OFDMA system having $N_r$ SSs, according to one embodiment of the present invention. As shown in FIG. 4, each SS (indicated by reference numeral 402) has $M_T$ transmission antennas and BS 404 has $M_R$ reception antennas. Suppose the i-th SS has selected the q-th ranging subchannel, and $X_{i,r}^{(m)(m_t)}$ denotes the frequency-domain ranging code vector of the i-th SS at the m-th OFDM symbol interval transmitted by the $m_t$-th transmission antenna. The k-th element (for $k \in \{0, \ldots, N-1\}$) of $X_{i,r}^{(m)(m_t)}$ is given by:

$$X_{i,r}^{(m)(m_t)}(k) = \begin{cases} A_{i,r}^{(m_t)} C_{i,r}^{(m_1)}(l), & k = \zeta_q(l), l = 0, \ldots, \gamma_r - 1; m = M_1 \cdot t + m_1 \\ 0, & \text{otherwise} \end{cases} \quad (1)$$

where $C_{i,r}^{(m_1)}(l)$ is the ranging symbols with $|C_{i,r}^{(m_1)}(l)|=1$, and $A_{i,r}^{(m_t)}$ is the scaling factor. The N-point inverse discrete Fourier transform ($\text{IDFT}_N$) of $X_{i,r}^{(m)(m_t)}$ (i.e., the time domain representation $x_{i,r}^{(m)(m_t)}$ of $X_{i,r}^{(m)(m_t)}$) is represented by $[x_{i,r}^{(m)(m_t)}(0), \ldots, x_{i,r}^{(m)(m_t)}(N-1)]^T$. The last $N_g$ samples of the $\text{IDFT}_N$ output are copied and inserted as the cyclic prefix (CP) to avoid inter-symbol interference (ISI); that is, $x_{i,r}^{(m)(m_t)}(-l) = x_{i,r}^{(m)(m_t)}(N-l)$ for $l=1, 2, \ldots, N_g$. Then the time domain signal samples from the i-th SS are given by $$x_{i,r}^{(m_t)}(n) = \begin{cases} x_{t,r}^{(m)(m_t)}(l - N_g), & n = m(N + N_g) + l, l = 0, \ldots, N + N_g - 1 \\ & m = 0, \ldots, M_r - 1 \\ 0, & \text{otherwise} \end{cases} \quad (2)$$

Let the sample-spaced channel impulse response for the i-th SS be:

$$h_{i,r}^{(m_t,m_r)}(\tau) = \sum_{l=0}^{L-1} h_{i,r}^{(m_t,m_r)}(l) \delta(\tau - lT_s), \quad (3)$$

where $h_{i,r}^{(m_t,m_r)}(l)$ and $lT_s$ are the complex gain and the delay of the l-tap, respectively; $T_s$ is the sampling period; and L is the number of sample-spaced channel taps. At the BS's $m_r$-th receive antenna, the received samples from the i-th ranging SS are then given by:

$$y_{i,r}^{(m_r)}(n) = \sum_{m_t=1}^{M_T} \sum_{l=0}^{L-1} h_{i,r}^{(m_t,m_r)}(l) x_{i,r}^{(m_t)}(n - l - d_{i,r}), \quad (4)$$

where $d_{i,r}$ is the transmission delay at the i-th SS. Since there can be data users transmitting within the same symbol, the corresponding received samples of the j-th data user are denoted by $y_{j,d}^{(m_r)}(n)$. Then the time domain received signal of the $m_r$-th antenna at the BS can be expressed as:

$$y^{(m_r)}(n) = \sum_{i=1}^{N_r-1} y_{i,r}^{(m_r)}(n) + \sum_{j=1}^{N_d-1} y_{j,d}^{(m_r)}(n) + \omega^{(m_r)}(n), \quad (5)$$

where $\{\omega^{(m_r)}(n)\}$ are independent and identically-distributed (i.i.d.), circularly-symmetric complex Gaussian noise samples with zero mean and variance $\sigma_\omega^2$. Throughout this document, SS refers to ranging SS unless otherwise specified.

Figure 5:
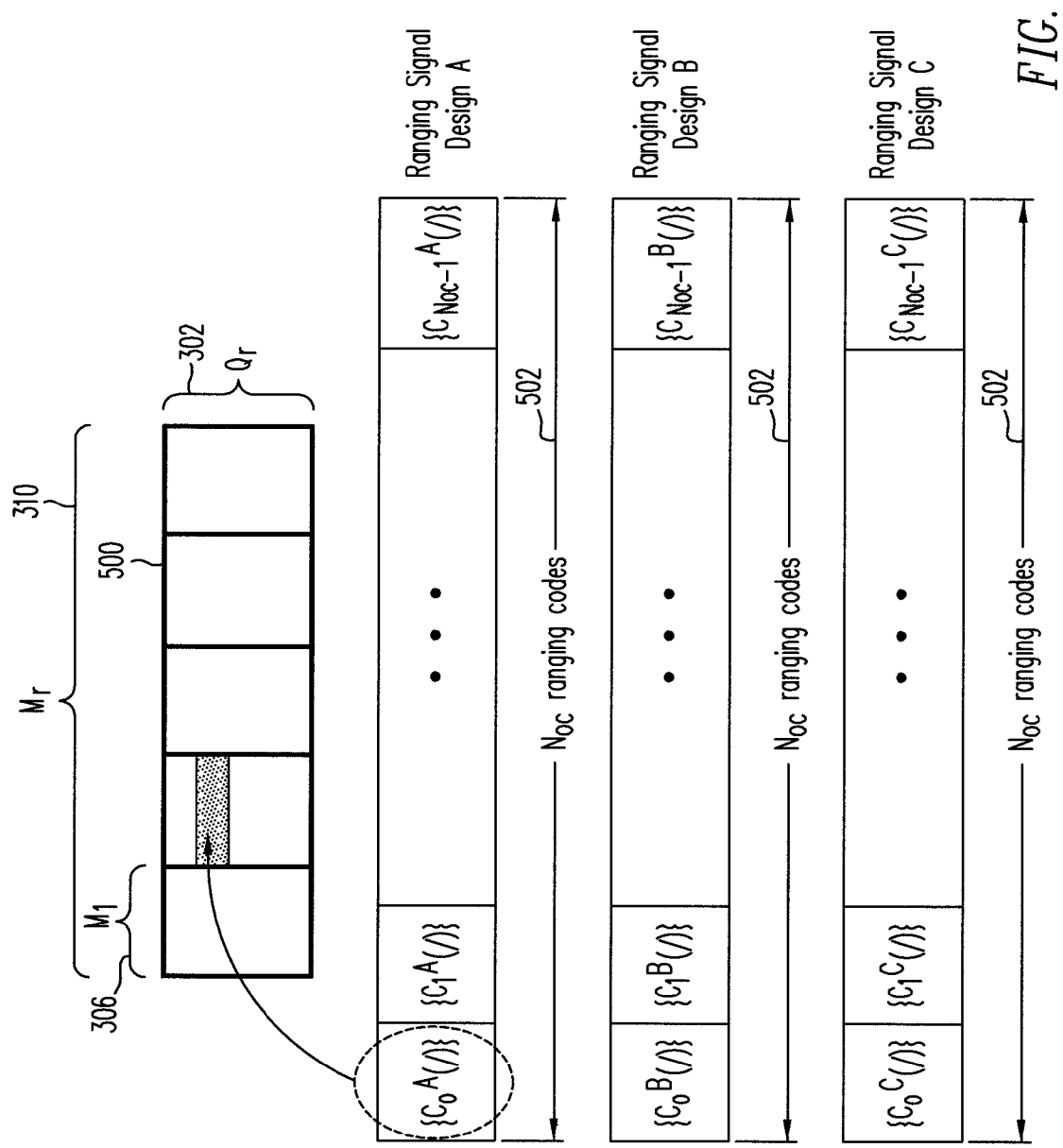
FIG. 5 illustrates the use of the three ranging signal designs, in accordance with one embodiment of the present invention.

According to one embodiment of the present invention, three ranging signal designs are provided according to cell sizes: (a) Ranging Signal Design A, for small cells; (b) Ranging Signal Design B, for medium cells; and (c) Ranging Signal Design C, for large cells. FIG. 5 illustrates the use of the three ranging signal designs, in accordance with one embodiment of the present invention. As shown in FIG. 5, each ranging signal design has $N_{oc}$ frequency-domain orthogonal codes $\{C_c(l): c, l=0, 1, \ldots, N_{oc}-1\}$, which may be implemented, for example, by BPSK-modulated Walsh codes of length $N_{oc}$, where the indexes c and l of $C_c(l)$ denote the ranging code index and the orthogonal code element index, respectively. Each SS transmits a ranging code randomly chosen from the above $N_{oc}$ codes on the chosen ranging subchannel over the randomly chosen ranging time slot. Since each ranging time slot is equal to $M_1$ OFDM symbol interval (reference numeral 306), the total number of ranging opportunities is $$N_{total} = Q_r \cdot N_{oc} \cdot \frac{M_r}{M_1}$$

for the proposed designs. Note that, the number OFDM intervals of each ranging channel (i.e., $M_1$), and the total number of OFDM intervals for ranging (i.e., $M_r$), and the number of subchannels (i.e., $Q_r$) may be different for the different signal designs. The detailed descriptions of the three classes of ranging signal designs are given below. First, the ranging signal designs which can be directly applied to single antenna OFDMA systems are described. For MIMO OFDMA systems, these ranging signals are appropriately mapped to the transmit antennas according to the MIMO ranging transmission scheme, and the mapping will be described together with the ranging transmission schemes.

Ranging Signal Design A is designed for small cells. If the CP length $N_g$ satisfies $N_g \geq d_{max}+L-1$, allocating one OFDM symbol interval per ranging time slot (i.e., $M_1=1$) is sufficient. Ranging Signal design A for the i-th SS, picking the c-th ranging code, the t-th ranging time slot and the q-th ranging subchannel, is given by:

$$X_{i,r}^{(m)}(k) = \begin{cases} A_{i,r} C_c(l), & l = 0, \ldots, \frac{\gamma_r}{2} - 1, k = \zeta_q(l), m = t \\ A_{i,r} C_c\left(l - \frac{\gamma_r}{2}\right), & l = \frac{\gamma_r}{2}, \ldots, \gamma_r - 1, k = \zeta_q(l), m = t \\ 0, & \text{otherwise,} \end{cases} \quad (6)$$

where m denotes the OFDM symbol index and $\gamma_r = 2N_{oc}$.

Ranging Signal Design B is designed for medium cells in which the timing offset of an unsynchronized SS plus the channel length can be larger than the CP length $N_g$ (i.e., $d_{max}+L-1>N_g$). Then, two OFDM ranging symbol intervals (i.e., $M_1=2$) may be used to absorb large timing offsets. Ranging code detection is performed based on the second OFDM ranging symbol. Ranging Signal Design B for the i-th SS, picking the c-th ranging code, the t-th ranging time slot and the q-th ranging subchannel, is given by:

$$X_{i,r}^{(m)}(k) = \begin{cases} A_{i,r}C_c(l)e^{-\frac{j2\pi\zeta_q(l)N_g}{N}}, & l=0,\ldots,\frac{\gamma_r}{2}-1, k=\zeta_q(l), m=2t \\ A_{i,r}C_c(l), & l=0,\ldots,\frac{\gamma_r}{2}-1, k=\zeta_q(l), m=2t+1 \\ A_{i,r}C_c\left(l-\frac{\gamma_r}{2}\right)e^{-\frac{j2\pi\zeta_q(l)N_g}{N}}, & l=\frac{\gamma_r}{2},\ldots,\gamma_r-1, k=\zeta_q(l), m=2t \\ A_{i,r}C_c(l)\left(l-\frac{\gamma_r}{2}\right), & l=\frac{\gamma_r}{2},\ldots,\gamma_r-1, k=\zeta_q(l), m=2t+1 \\ 0, & \text{otherwise}, \end{cases} \quad (7)$$

where $\gamma_r=2N_{oc}$.

Ranging Signal Design C is designed for large cells. Ranging Signal Design C uses only two adjacent subcarriers in a ranging subchannel (i.e., $\gamma_r=2$), and moves the domain of the orthogonal ranging code design from the frequency domain to the time domain. In order to provide greater robustness against the channel delay spread and to absorb large timing offsets for a large cell, each ranging code is transmitted over two adjacent OFDM symbol intervals in a phase-continuous manner. Hence, the number of ranging OFDM symbol intervals per ranging time slot is $M_1=2N_{oc}$. Ranging Signal Design C for the i-th SS, picking the c-th ranging code, the t-th ranging time slot and the q-th ranging subchannel, is given by:

$$X_{i,r}^{(m)}(k) = \begin{cases} A_{i,r}C_c(l)e^{-\frac{j2\pi\zeta_q(\gamma)N_g}{N}}, & l=0,\ldots,N_{oc}-1, k=\zeta_q(\gamma), m=2l, \gamma=\{0,1\} \\ A_{i,r}C_c(l), & l=0,\ldots,N_{oc}-1, k=\zeta_q(\gamma), m=2l+1 \\ 0, & \text{otherwise}. \end{cases} \quad (8)$$

The above three classes of ranging signal designs can maintain orthogonality at the BS, while the ranging signals from IEEE 802.16a or IEEE 802.16e suffer from loss of orthogonality due to the channel frequency selectivity.

Figure 6:
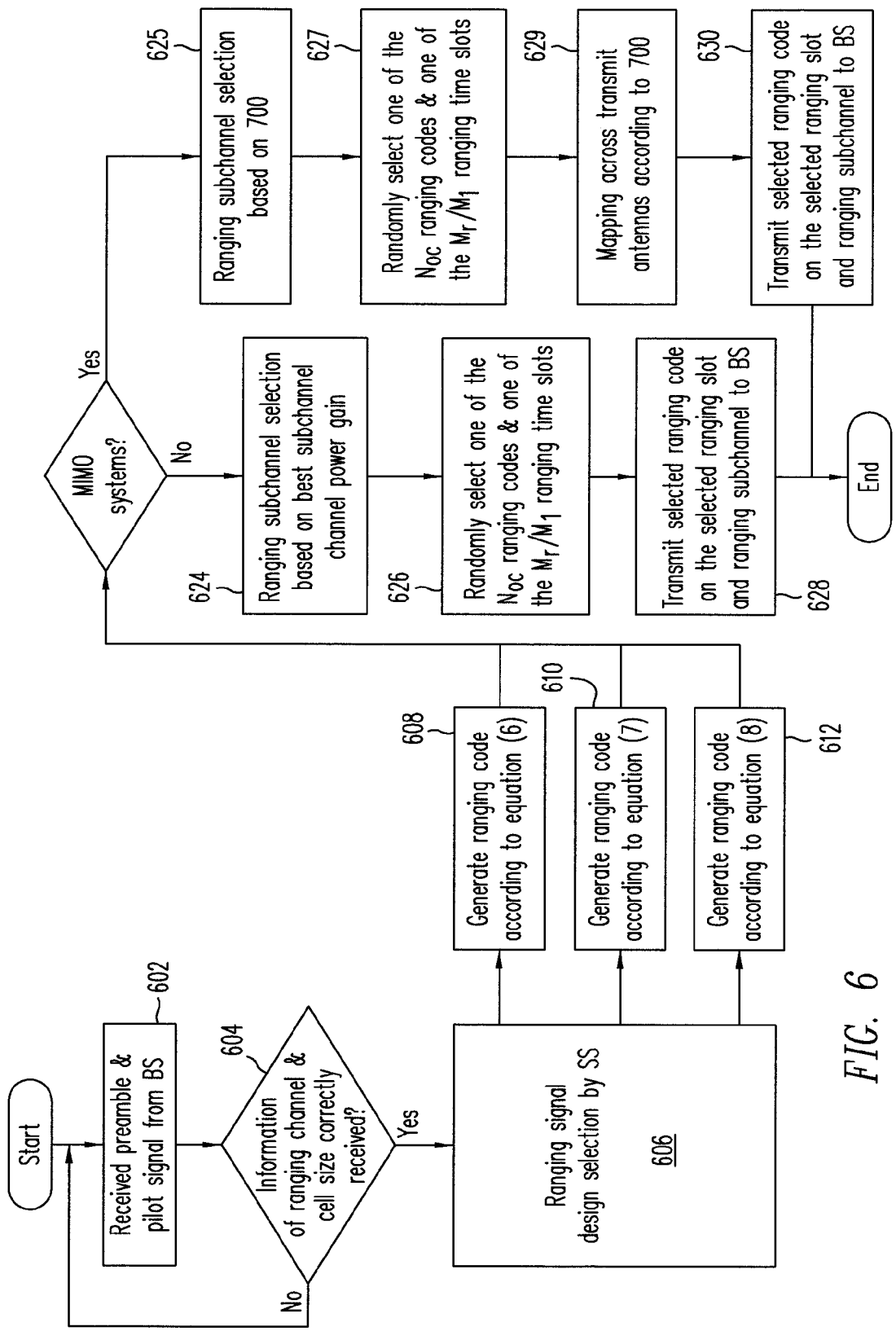
FIG. 6 is a flowchart showing the selection process at the SS for determining the ranging signal designs and the ranging transmissions, in accordance with one embodiment of the present invention.

FIG. 6 is a flowchart showing the selection process at the SS for determining the ranging signal designs, in accordance with one embodiment of the present invention. As shown in FIG. 6, at step 602, the SS receives from the BS a preamble and a pilot signal, which allows the SS to obtain DL synchronization and channel estimate. Based on its cell size, the BS also broadcasts information on which ranging signal design to be used (step 604). The SS obtains this information from the DL frame and selects the ranging signal design accordingly (step 606). The SS then randomly selects one of the $N_{oc}$ orthogonal ranging codes, and generates the ranging signals according to the selected design (e.g., using equation (6), (7), or (8)) through steps 608, 610, 612. If SS cannot correctly extract some or all of the ranging related information, the DL synchronization between BS and the SS during the initial stage may not have been carried out properly, and consequently none of the above ranging signal designs is selected. For SISO systems, the SS selects a ranging subchannel based on the best subchannel and channel power gain (step 624), selects a ranging code and ranging time slot (step 626), and transmits the selected ranging code in the selected subchannel at the selected time slot (step 628). For MIMO systems, in addition to ranging subchannel selection (step 625) and ranging code and ranging time slot selections (step 627), the generated ranging signals are mapped across transmission antennas (step 629) according to the ranging transmission scheme (see FIG. 7). The ranging signals are then transmitted on the selected ranging subchannel over the randomly chosen time slot out of the $$\frac{M_r}{M_1}$$

ranging time slots (step 630). Selection of the ranging code and mapping to the antennas are performed according to the selected transmission scheme (described in further detail below).

The cell size may change when (i) new cell sites are introduced within the same area or region to support a larger number of users or to accommodate an emergency or disaster situation (i.e., affected cell sizes may be accordingly reduced), (ii) a BS fails and one or more near-by BSs increase coverage to include at least a part of the faulty BS's cell (i.e., related cell sizes are accordingly increased). In one of the embodiments of this invention, based on the cell size, the BS broadcasts in the DL frame the information on which ranging signal design to be used which provides flexibility and adaptability of this invention to changes in the system environments and conditions.

The ranging signal designs of the present invention have several advantages over the prior art. These advantages include better ranging performance, greater energy savings, less computational complexity, and higher flexibility, scalability, and adaptability to changes in environments (e.g., the cell size).

Existing MIMO transmission schemes assume channel state information (CSI) is available at the receiver which is an acceptable assumption for data transmission. In initial ranging, however, CSI is unavailable at the receiver of the BS, but can be available at the SS transmitters.

Let $X^{(m_t)}(k)$ denote the frequency-domain ranging signal transmitted on the k-th subcarrier with $k \in \xi_q$ (a subcarrier of the of the q-th ranging subchannel) from $m_t$-th transmission antenna of the SS, and $H_q^{(m_t,m_r)}$ denote the channel gain of q-th ranging subchannel between the $m_t$-th transmission antenna of the SS and the $m_r$-th receive antenna of the BS. The noise-free received signal vector Y collected from the subcarrier $k \in \xi_q$ of the $M_r$ receive antennas is given by:

$$Y^T = X^T H_q, \quad (9)$$

where $$Y = [Y^{(1)}(k), \ldots, Y^{(M_r)}(k)]^T, X = [X^{(1)}(k), \ldots, X^{(M_t)}(k)]^T, \quad (10)$$

$$H_q = \begin{bmatrix} H_q^{(1,1)}(k) & H_q^{(1,2)}(k) & \ldots & H_q^{(1,M_r)}(k) \\ H_q^{(2,1)}(k) & H_q^{(2,2)}(k) & \ldots & H_q^{(2,M_r)}(k) \\ \vdots & \vdots & \vdots & \vdots \\ H_q^{(M_t,1)}(k) & H_q^{(M_t,2)}(k) & \ldots & H_q^{(M_t,M_r)}(k) \end{bmatrix}. \quad (11)$$

According to one embodiment of the present invention, the ranging signals from different reception antennas are non-coherently combined. Power control may also be applied, such that the received signal power is equal to $P_r$, given by:

$$|Y|^2 = Y^T Y^* = X^T H_q H_q^H X^* = X^T U \Lambda V^* X^* = P_r \quad (12)$$

where $U\Lambda V^*$ represents a singular value decomposition $(SVD)^4$ of $H_q H_q^H$.

[4] SVD typically requires complex computation and thus, require significant processing power and time.

In this embodiment, the present invention provides three ranging transmission schemes for the MIMO-OFDMA communication system of FIG. 4. The BS need not know what MIMO ranging transmission scheme each SS adopts, as that information is not necessary for ranging code detection, or timing and power estimation at the BS. As described in further detail below, the ranging transmission schemes of the present invention offer different trade-offs among processing complexity, power saving, and performance.

A first ranging transmission scheme of the present invention, referred to as the "Optimal Eigenmode Transmission Scheme" (OETS), results from minimizing transmission power $|X|^2$, subject to a fixed received ranging signal power $P_r$. This minimization is equivalent to choosing X to maximize $|Y|^2$, subject to the constraint of a fixed $|X|^2$. Let the largest eigenvalue (unit energy) and the corresponding normalized eigenvector of $H_q H_q^H$ be denoted by $\lambda_{max}$ and $U_{max}$, respectively, where the subchannel index q is omitted for simplicity. In OETS, using the channel estimates obtained from DL preamble and pilots, each SS computes $\lambda_{max}$ for each ranging subchannel, and selects the ranging subchannel with the largest $\lambda_{max}$. Thus, OETS transmits on the strongest eigenmode of the best ranging subchannel. The best ranging subchannel is the ranging subchannel with the largest singular value among all the ranging subchannels. After obtaining both $U_{max}$ and the $\lambda_{max}$ of the best ranging subchannel, the ranging signal is spread by $U_{max}$ over the SS's transmission antennas.

For the i-th ranging SS which has selected the q-th ranging subchannel, the ranging signal vector X transmitted across the $M_t$ transmit antennas on the k-th subcarrier with $k \in \xi_q$ during the m-th symbol interval is given by:

$$X = X_{i,r}^{(m)}(k) U_{max}, \quad (13)$$

where $X_{i,r}^{(m)}$ is obtained from the adopted ranging signal design, and $U_{max}$ maps the ranging symbol across the transmit antennas. The transmission power is adjusted to $$\frac{P_r}{\lambda_{max}}$$

so that the received ranging signal power is $P_r$. OETS requires $Q_r$ SVD operations on $M_T \times M_R$ matrices, $Q_r - 1$ compare operations, and $M_T N_c$ complex multiplications at each SS.

A second ranging transmission scheme of the present invention, referred to as the "Suboptimal Eigenmode Transmission Scheme" (SETS), results from modifying the subchannel selection algorithm of the OETS. Under the SETS, rather than selecting the ranging subchannel with the largest singular value (e.g., in OETS), the ranging subchannel with the largest channel power gain is selected as the best ranging subchannel. Channel power gain is provided by: $\Sigma_{m_t=1}^{M_T} \Sigma_{m_r=1}^{M_R} |H_{i,r}^{(m_t,m_r)}|^2$. In SETS, after selecting the ranging subchannel, the ranging signal generation, mapping across the transmit antennas, and power adjustment follow the same procedure as OETS. Although SETS requires $Q_r M_T M_R + M_T N_c$ complex multiplications, $Q_r M_T M_R - 1$ real additions and $Q_r - 1$ compare operations, only one SVD operation on the selected ranging subchannel is required.

A third ranging transmission scheme of the present invention, referred to as the "Single Antenna Selection Transmission Scheme" (SASTS), further reduces the complexity by selecting a single transmit antenna. Under SASTS, each SS picks the antenna and the ranging subchannel which gives the largest single-input-multiple-output (SIMO) ranging subchannel channel power gain—given by: $\Sigma_{m_r=1}^{M_R} |H_{i,r}^{m_t,m_r}|^2$—and adjusts the transmission power to $$\frac{P_r}{\sum_{m_r=1}^{M_R} |H_{i,r}^{(m_t,m_r)}|^2}$$

so that the received ranging signal power is $P_r$.

SIMO stands for single-input-multiple-outlet in which the transmitte side has Only single input after the antenna selection. Since only one transmission antenna is used for the ranging transmission, the ranging signal obtained from the adopted design is directly mapped to the selected ranging subchannel of the selected transmit antenna. SASTS requires $Q_r M_T M_R$ complex multiplications, $Q_r M_T (M_R - 1)$ real additions and $Q_r M_T - 1$ compare operations.

The general approach of OETS, SETS and SASTS and quantitative measures of their respective complexities are summarized in Table 1 below:

TABLE 1

| Transmission Scheme | Approach | Computation Complexity |
|---|---|---|
| OETS | The SS performs SVD of MIMO channel matrix for each ranging subchannel and selects the ranging subchannel with the largest singular value $\lambda_{max}$. The transmission is in the direction of the strongest eigenvector corresponding to $\lambda_{max}$ on the selected ranging subchannel. Transmission power adjustment is applied to provide a target received power. | 1) Number of SVD: $Q_r$. 2) Number of compare operation: $Q_r - 1$ 3) Number of complex multiplications: $M_T N_c$ |
| SETS | The SS selects the ranging subchannel based on the largest MIMO channel power gain i.e., $\Sigma_{m_t=1}^{M_T} \Sigma_{m_r=1}^{M_R} |H_{i,r}^{(m_t,m_r)}|^2$. Then, the SS performs SVD of the MIMO channel matrix of the | 1) Number of SVD: 1 2) Number of compare operation: $Q_r - 1$ 3) Number of complex multiplications: $Q_r M_T M_R + M_T N_c$ |

TABLE 1-continued

| Transmission Scheme | Approach | Computation Complexity |
|---|---|---|
| | selected ranging subchannel and transmits in the direction of the strongest eigenvector with the largest eigenvalue on the selected ranging subchannel. Transmission power adjustment is applied to provide a target received power. | 4) Number of real additions: $Q_r M_T M_R - 1$ |
| SASTS | The SS computes SIMO[5] channel power gain (i.e., $\Sigma_{m_r=1}^{M_R} |H_{i,r}^{(m_t,m_r)}|^2$) of each ranging subchannel for each transmit antenna and selects the antenna and the ranging subchannel which provide the largest SIMO channel power gain. Transmission power adjustment is applied to provide a target received power. | 1) Number of SVD: 0<br>2) Number of compare operation: $Q_r M_T - 1$<br>3) Number of complex multiplications: $Q_r M_T M_R$<br>4) Number of real additions: $Q_r M_T (M_R - 1)$ |

[5]SIMO stands for single-input-multiple-output in which the transmitter side has only single input after the antenna selection.

Figure 7:
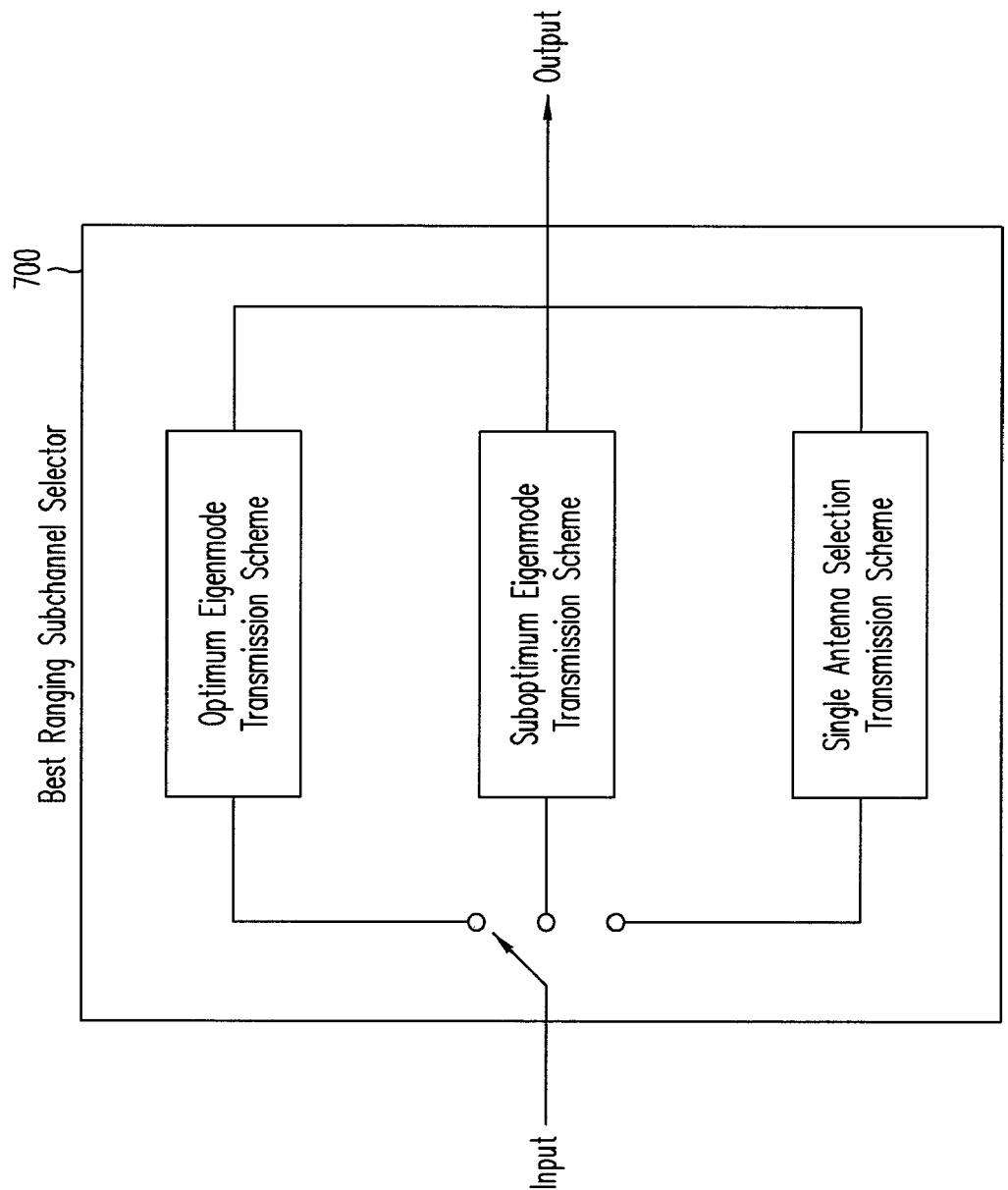
FIG. 7 illustrates selecting the best ranging subchannel based on the OETS, SETS and SASTS, in accordance with one embodiment of the present invention.

FIG. 7 illustrates selecting the best ranging subchannel based on the OETS, SETS and SASTS, in accordance with one embodiment of the present invention. OETS and SETS have comparable ranging performance, except that OETS has a marginal ranging transmission energy saving over SETS. SASTS is substantially less complex, as compared to OETS and SETS, even though OETS and SETS provide a slight advantage in ranging transmission energy saving. OETS, SETA and SASTS achieve significant ranging transmission energy saving over the existing methods (e.g., Modlin, described above). For example, based on simulation results performed using two of the ITU channel models, namely, pedestrian B ("Ped B") and vehicular A ("Veh A"), SASTS reduces energy consumption at an SS to approximately ¼ of that required by existing methods, such as Modlin. The simulation results are discussed in the article "Ranging Signal Designs for MIMO-OFDMA Systems" ("Zeng"), by J. Zeng, H. Minn, and C. C. Chong, submitted to the *IEEE Trans. Wireless Communication*. The disclosure of Zeng is hereby incorporated by reference in its entirety. In addition, SASTS also requires a lesser number of frames to perform the ranging process, thus yielding further energy saving.

Figure 8A:
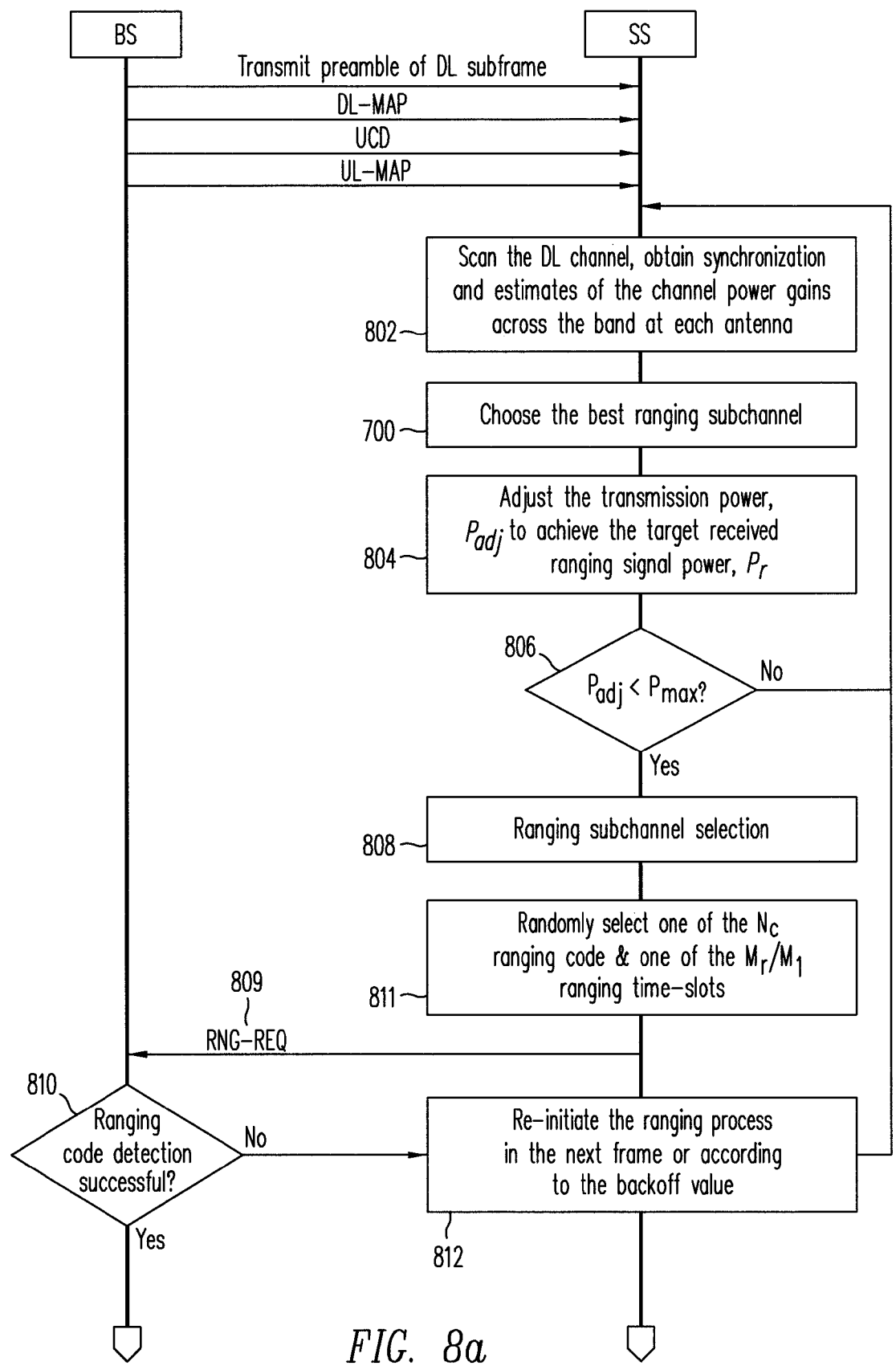
FIGS. 8(*a*) and 8(*b*) together shows a flowchart which summarizes a MIMO-OFDMA ranging process that is based on OETS, SETS and SASTS, according to one embodiment of the present invention.
Figure 8B:
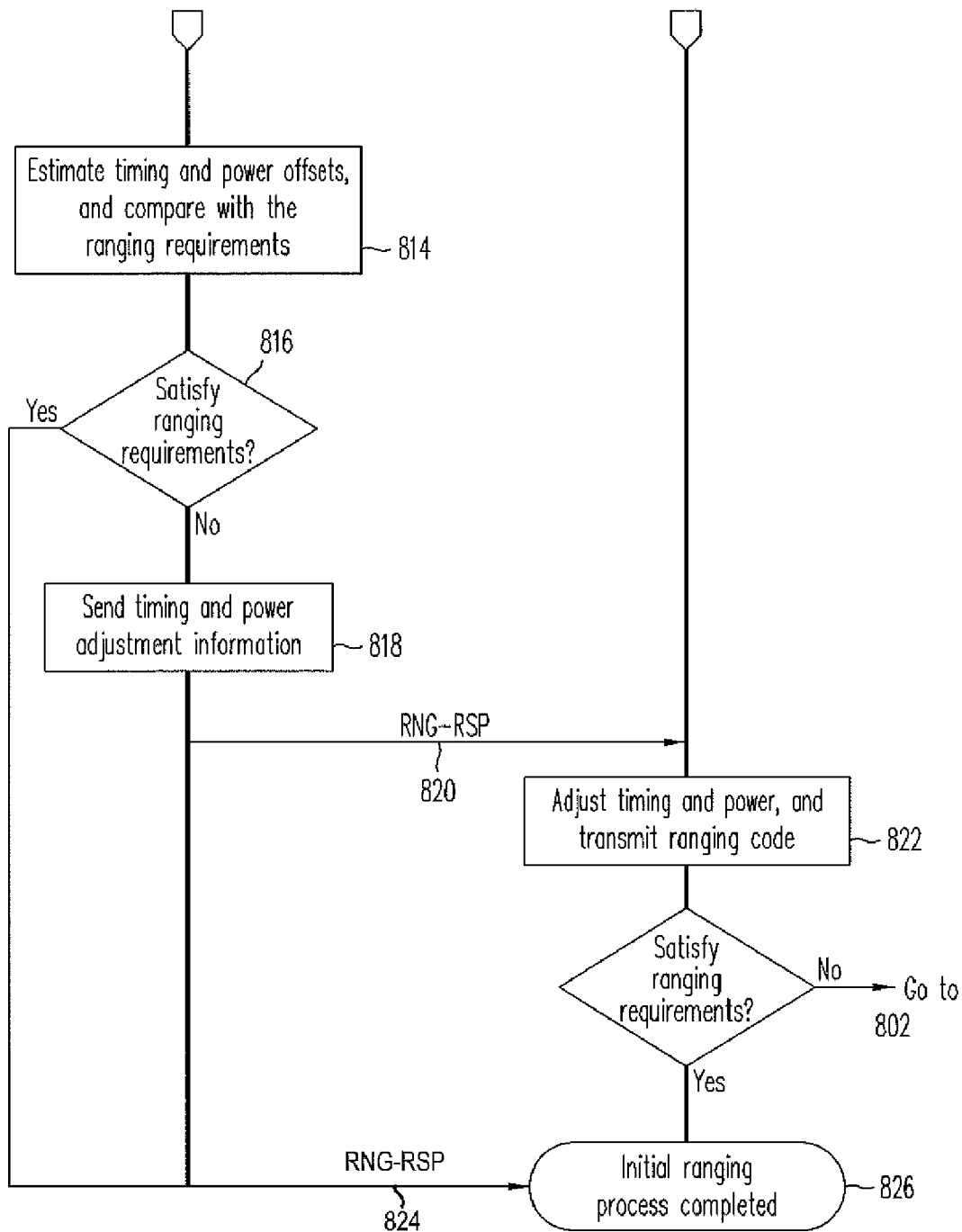

FIGS. 8(a) and 8(b) together shows a flowchart which summarizes a MIMO-OFDMA ranging process that is based on OETS, SETS and SASTS, according to one embodiment of the present invention. At step 802, each SS estimates channel power gains across the entire frequency band, utilizing the DL preamble and the pilot signals embedded in the OFDM symbols received at each antenna. The SS then selects the best ranging subchannel (step 700) under a ranging transmission scheme selected by, for example, the selection process illustrated in FIG. 7 above. At step 804, the SS adjusts the transmission power to achieve the target received ranging signal power $P_r$. At step 806, if the adjusted transmission power is greater than the maximum allowable transmission power $P_{max}$, the SS does not initiate the ranging process and instead, returns to step 802.

However, at step 806, if the adjusted transmission power is less than the maximum allowable transmission power $P_{max}$, each SS then performs ranging subchannel selection at step 808 and randomly chooses at step 811 one of the $N_{oc}$ orthogonal codes and one of the $$\frac{M_r}{M_1}$$

ranging time slots. At step 809, the SS transmits the ranging signal over the selected ranging sub-channel in the selected ranging time slot. At the BS, at step 810, the receiver detects whether or not a ranging code is transmitted from an SS, and extracts the timing and power information based on the detection results. If the ranging code detection of step 810 fails, at step 812, the SS re-initiates the ranging process in the next frame or after a time determined by a truncated exponential back-off scheme[6]. If the ranging code detection of step 810 is successful, at step 814, the BS compares the estimated timing offset and power with the ranging requirements for detected SS. At step 816, if the requirements are satisfied, the BS informs the SS that ranging process is successful using a RNG-RSP (success) message at step 824. Otherwise, i.e., the ranging requirement at step 816 is not satisfied, at steps 818 and 820, the BS sends the SS timing and power adjustment parameters in a RNG-RSP message to provide status notification. The RNG-RSP message also contains the code, ranging sub-channel, and time slot where the corresponding SS is detected. Upon receiving the RNG-RSP message, at step 822, the SS adjusts the time off-sets and the transmission power using the received information, and continues the ranging process. In general, in time-varying channels where the channels may substantially change between ranging transmissions, the SS returns to step 802 of the process. Upon receiving the RNG-RSP (success) message of step 824, the ranging process is deemed completed (step 826).

Here, we assume that the channel is time-varying, so that the channel may Substantially change between ranging transmissions.

The ranging procedure or protocols of FIGS. 8(a) and 8(b) are described for general time-varying channels, where the channels may change substantially between ranging transmissions. However, for slow-changing time-varying channels, in performing steps 812 or 822, the SS can also directly use the ranging code, time-slot and subchannel selected in the previous ranging attempt, rather than repeating the selection process, thereby reducing computation complexity.

Note that initial ranging process may be implemented several ways. For example, the success status of the initial ranging may be defined as the condition when the ranging code is successfully detected and the timing and power are within the allowable ranges. Or alternatively, the success condition may be simply when the ranging code is detected successfully. In the latter case, it is implicitly assumed that one feedback information on the timing and power adjustment in the RNG-RSP message is sufficient. Other steps, such as providing basic CID and resource allocation for ranging registration, may also be considered part of the initial ranging process after a successful ranging code detection and timing and power adjustment. The present invention is not limited to any particular definition or any scope of initial ranging process, but can be applied to a broad range of conditions. In other words, the ranging transmission schemes of the present invention are not limited by the ranging procedure or protocols illustrated in FIGS. 8(a) and 8(b). The ranging transmission schemes of the present invention may be applicable to other ranging procedure or protocols within the scope of the present invention.

The ranging transmission schemes described above require that the DL and UL channels to be reciprocal, so that deployment in a TDD OFDMA system (e.g., TDD OFDMA system of FIG. 2) appears more natural. However, when the reciprocity of the channel can be met in the FDD case (e.g., when the frequency duplex separation is smaller than the coherence bandwidth), the ranging transmission schemes of the present invention may be also be applicable to such an FDD system. In this case, the ranging subchannel selection is performed randomly, which also reduces the complexity.

Advantages of the ranging signal transmission schemes of the present invention (e.g., OETS, SETS and SASTS) over the prior art include significant power saving and computational complexity reduction. An additional advantage is their capability to provide flexibility and scalability between performance and computation trade-offs.

The detailed description above is provided to illustrate specific embodiments of the present invention and is not intended to be limiting. Numerous variations and modifications within the scope of the present invention are possible. The present invention is set forth in the following claims.

We claim:

1. A method for initial ranging by a single transmitting antenna subscriber station in an OFDMA system using a plurality of subcarriers arranged into a plurality of subchannels, comprising:
   receiving from a base station system information regarding a cell size for the base station and signal power information;
   based on the cell size, selecting a ranging code class from a plurality of ranging code classes to provide a selected ranging code class;
   selecting a ranging code from the selected ranging code class to provide a selected ranging code;
   selecting a subchannel from the plurality of subchannels based upon a best subchannel power gain;
   selecting from a plurality of OFDM symbol time slots to provide a selected ranging time slot; and
   in the selected time slot, communicating the selected ranging code to the base station over the selected subchannel.

2. A method as in claim 1, wherein the selected ranging time slot has a duration of one OFDM symbol interval.

3. A method as in claim 1, wherein the selected ranging time slot has a duration of multiple OFDM symbol intervals.

4. A method as in claim 1, wherein the selected ranging code is transmitted over multiple OFDM symbol intervals in a phase-continuous manner.

5. A method as in claim 1, wherein each ranging code class comprises a predetermined number of frequency-domain orthogonal codes.

6. A method as in claim 5, wherein the frequency-domain orthogonal codes comprise BPSK-modulated Walsh codes.

7. A method as in claim 5, wherein a time-domain representation of each frequency-domain orthogonal code is obtained by an inverse fast Fourier transform of the frequency-domain orthogonal code together with a cyclic prefix comprising a predetermined number of sample points of the inverse fast Fourier transform.

8. A method as in claim 1 wherein, when communicating the selected ranging code to the base station is unsuccessful, the selected ranging code is re-transmitted to the base station after a predetermined back-off time.

9. A method as in claim 1, wherein the OFDMA system comprises a time-division duplex system.

10. A method for initial ranging by a multiple-transmitting antennas subscriber station in an OFDMA system using a plurality of subcarriers arranged into a plurality of subchannels, comprising:
    scanning a down-link channel between the subscriber station and a multiple-receiving antennas base station to estimate subchannel gains between each transmitting antenna of the subscriber station and each receiving antenna of the base station;
    based on the estimated subchannel gains, selecting a subchannel from the plurality of subchannels for initial ranging to provide a selected subchannel
    based on the estimated subchannel gains, adjusting a transmission power to provide an adjusted transmission power so that the base station receives a target received ranging signal power;
    determining a mapping function for the multiple transmitting antennas based upon the estimated subchannel gains to provide a determined mapping function; and
    transmitting the ranging code signal from the multiple-transmitting antennas to the base station over the selected subchannel according to the adjusted transmission power and the determined mapping function.

11. A method as in claim 10, further comprising selecting a ranging code class based upon a cell size for the base station, a ranging time slot, wherein transmitting the ranging code signal comprises transmitting a selected ranging code from the selected ranging code class in the selected subchannel during the selected ranging time slot.

12. A method as in claim 11 wherein, if the transmitted ranging code signal is not received successfully by the base station, the selected ranging code is re-transmitted to the base station after a predetermined back-off time.

13. A method as in claim 10, wherein the transmission power adjustment minimizes the adjusted transmission power based on a fixed value for the target received ranging signal power.

14. A method as in claim 13, wherein the subchannel selection is further based on a largest eigenvalue of a MIMO channel matrix derived from the estimated subchannel gains.

15. A method as in claim 14, wherein the eigenvalue is obtained using a singular value decomposition of a function of the MIMO channel matrix.

16. A method as in claim 13, wherein the subchannel selection is based on a largest channel power gain derived from a function of the estimated subchannel gains.

17. A method as in claim 13, wherein the OFDMA system comprises a multiple-input-multiple-output (MIMO) data communication system.

18. A method for initial ranging by a multiple-transmitting antennas subscriber station in an OFDMA system using a plurality of subcarriers arranged into a plurality of subchannels, comprising:

scanning a down-link channel between the subscriber and a multiple-receiving antennas base station to estimate subchannel gains between each transmitting antenna of the subscriber station and each receiving antenna of the base station;

based on the estimated subchannel gains, selecting a transmitting antenna and a subchannel from the plurality of subchannels providing a greatest single-input-multiple output (SIMO) gain;

based on the estimated subchannel gains, adjusting a transmission power to provide an adjusted transmission power such that the base station receives a target received ranging signal power;

transmitting a ranging code signal through the selected transmitting antenna and across the selected subchannel to the base station according to the adjusted transmission power.

\* \* \* \* \*